United States Patent [19]
Masucci

[11] 3,770,343
[45] Nov. 6, 1973

[54] ADJUSTABLE BIFOCAL SPECTACLES

[76] Inventor: Alan A. Masucci, 1910 University Ave., New York, N.Y. 10453

[22] Filed: Apr. 5, 1972

[21] Appl. No.: 241,331

[52] U.S. Cl.................................. 351/55, 351/148
[51] Int. Cl............................................. G02c 3/00
[58] Field of Search ................ 351/5, 55, 148, 107

[56] References Cited
UNITED STATES PATENTS

| | | | |
|---|---|---|---|
| 3,425,773 | 2/1969 | Masucci | 351/55 |
| 2,112,163 | 3/1938 | Kimmel | 351/55 |
| 2,184,417 | 12/1939 | Ellestad | 351/55 |
| 2,277,726 | 3/1942 | Splaine | 351/55 |
| 2,486,881 | 11/1949 | Roth | 351/55 |

Primary Examiner—David Schonberg
Assistant Examiner—Paul A. Sacher
Attorney—William V. Pesce

[57] ABSTRACT

Spectacles with adjustable lenses which include a frame with extended arms and bridge, thebridge having track means for holding a lens chassis capable of assuming a plurality of positions relative to frame. The len chassis includes a pair of lens and bridge structure supporting said lens, the bridge structure including a pair of spaced-apart support tubes for holding flexible nylon bushings disposed to fit within said tubes and said track for movement along said tract relative to said frame. The lens chassis permits different viewing area of the lens to be exposed when the chassis is moved along said track.

4 Claims, 7 Drawing Figures

PATENTED NOV 6 1973 3,770,343
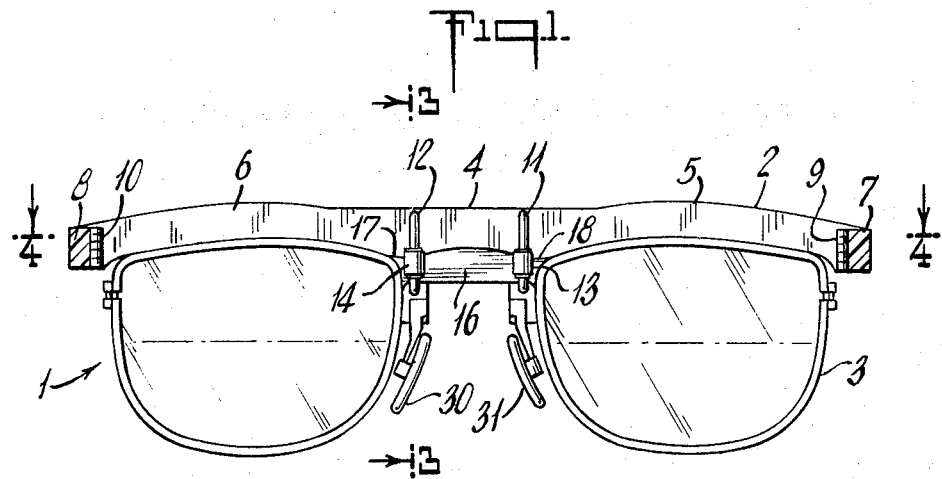
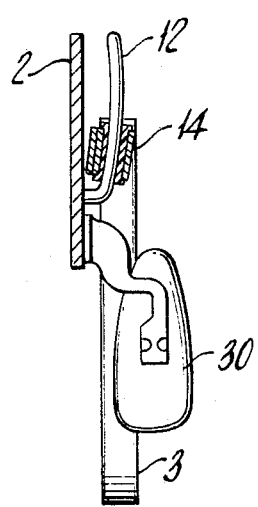 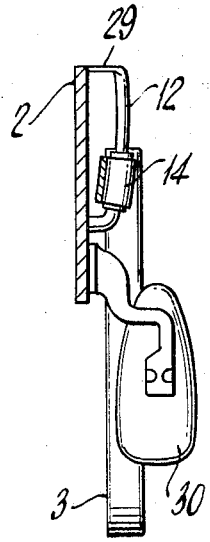 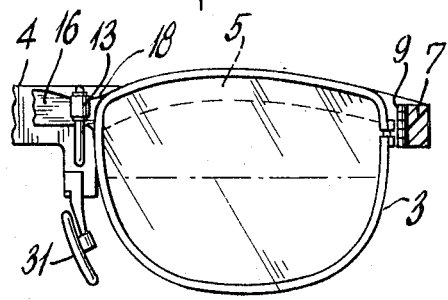
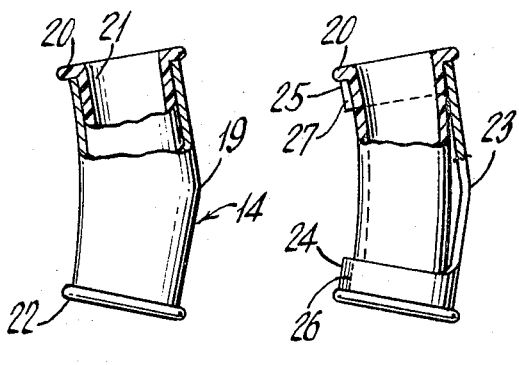
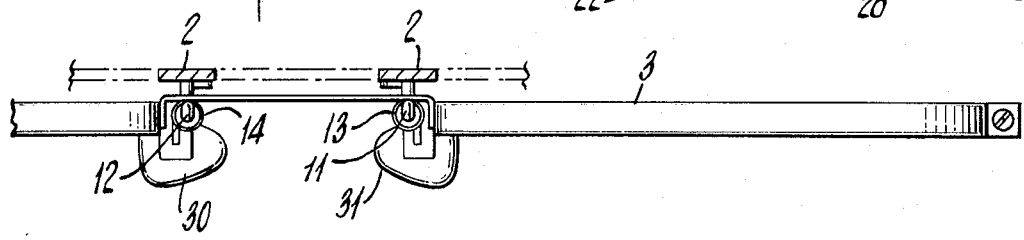

ADJUSTABLE BIFOCAL SPECTACLES

This invention relates generally to bi-focal spectacles and is particularly directed to adjustable bi-focal spectacles wherein the field of view may be conveniently alterable at will by the user without changing or altering the line of sight of the viewer.

It is an object of the present invention to provide a single, rugged, easily adjustable pair of spectacles wherein the field of view is alterable without changing the line of sight of viewer.

Another object of the invention is to provide an adjustable pair of spectacles whose lenses may be adjusted to one of two positions to provide two different viewing areas of the lens.

A still further object of the invention is to provide adjustable lens which permits smooth relative motion of lens chassis relative to bridge and prevents bending and erratic motion.

A still further object of the lens is the elimination of tensional bridge structure of lens chassis thereby eliminating the cost of said spring, the lubrication therefore, the labor involved in soldering said spring and the wear and tear and cost of replacing same.

Other objects and advantages will become apparent from a reading of the specification, and a study of the accompanying drawings in which:

FIG. 1 shows an elevational view of the spectacles assembly including frame and carriage according to the invention;

FIG. 2 shows view of a single section of frame and chassis with lens positioned to lowest downward position;

FIG. 3 shows a sectional view through the line 3 — 3 of FIG. 1;

FIG. 4 shows a sectional view through the line 4 — 4 of FIG. 1;

FIG. 5 shows partially in section an elevational view of tube and bushing therein according to one embodiment of the invention;

FIG. 6 shows partially in section an elevational view of a clamp type tube and bushing therein according to another embodiment of the invention;

FIG. 7 shows a sectional view through the line 3 — 3 wherein the track portion at the upper extremity thereof is attached to the frame.

Now describing the invention with respect to the various FIGURES, keeping in mind that throughout the specifications like parts will be given the same reference numbers, there is shown particularly in FIG. 1 a pair of spectacles 1 having a frame 2 and lens chassis 3 disposed to move relative thereto according to the invention described herein.

In particular, FIG. 1 shows a frame 2 composed of a central bridge portion 4 attached to, on opposing sides, a pair of extended arms 5 and 6 whose extremes 7 and 8 carry a pair of hinge joints 9 and 10 for pivotally mounting the forward ends of temples, not shown, in a well-known manner. The central bridge member 4 further includes a pair of spaced-apart tracks 11 and 12 for receiving tubing assemblies 13 and 14 fixedly attached to lens chassis 3 along the bridge portion 16 thereof on opposing ends thereof 17 and 18. The said tubing assemblies 13 and 14 are disposed to ride along said track 11 and 12 to permit relative displacement of lens chassis and frame to permit different fields of view.

In FIG. 3, a view through the line 3 — 3 of FIG. 1 shows in particular the track 12 and tubing assembly 14 in operable engagement therewith. The tubing assembly 14, as shown in FIG. 5 comprises a slightly bent tube 19 and a flexible bushing 21 residing therein and disposed to follow the contour of the tube. Further, the said flexible tubing, composed of nylon or other suitable synthetic fiber or flexible material, contains at the outer extremities annular type flanges 20, 22 to permit the bushing to remain stable and fixed within the tubing.

FIG. 6 shows another embodiment of the tubing assembly, and wherein the tubing is representative of a clamp or strap-like member 23, similarly bent or curved as the tubing 19 of FIG. 5, and wherein the clamp portion constitutes a pair of split collars 24, 25, each being slit along the longitudinal part 26, 27 to facilitate the mounting or retention of bushing 20 as shown in FIG. 5.

The tubing assembly 14, shown in FIG. 3, and as constituted in FIGS. 5 and 6, is disposed to adhere to the track member 12 in friction-like fashion. The nylon bushing being flexible slides along said track in response to the urgency thereof by the user, when lens chassis is moved relative to said frame. The nylon bushing, being relatively smooth has a friction co-efficient sufficient to prevent sliding of chassis relative to frame, unless there is actual force used in moving one relative to the other. Hence, there is smooth motion when required between frame and chassis, with stability of mobility when positioning is finalized.

FIG. 7, as in FIG. 3, is a view through the line 3 — 3 of FIG. 1. However, the track portion of FIG. 7 is adhered to the frame 2 at both extremities 29, 30 to permit a sturdier support, especially where excessive use or movement is anticipated between chassis and frame. However, the chassis and frame are first mounted prior to the attachment of the track at the extremities else assembly could not be possible. The frame also has attached thereto, below the track portions of said frame, a pair of nose rests 30, 31 attached to said frame, and depending therefrom for the usual purpose.

Referring to FIGS. 1 and 2, it may be seen that the chassis relative to frame are displaced in different positions to afford the user different fields of view. In particular, FIG. 1 represents the maximum displacement of chassis and frame permitting the user a view through the upper portion of lens. Conversely, FIG. 2 permits the user a view through the lower portion of lens. However, it may be appreciated that various fields of view in between these two extremes is possible by simply manipulating and adjusting the movements between frame and chassis. Hence, simple rapid, smooth and positive means is provided for adjusting the viewing area of the lens to permit the viewer to use different field of view of the lens without changing or altering his line-of-sight which can be cumbersome and sometimes hazardess. The user is also permitted the easy facility of adjustment without any slippage or bumping, or other unwanted motions can take place.

While the invention has been described and illustrated with respect to certain particular preferred embodiments which give satisfactory results, it will be understood by those skilled in the art, after understanding the principles of the invention, that various changes and modifications may be made without departing from the spirit and scope of the invention, and it is intended therefore in the appended claims to cover all such changes and modifications.

Having defined the invention, what is claimed is:
1. Spectacles with adjustable lenses comprising:
   a. a frame including a centrally disposed bridge having a pair of spaced-apart track members attached thereto,
   b. a lens chassis including a centrally disposed bridge having a pair of spaced-apart holding tubes fixedly attached thereto vertically oriented,
   c. bushing means within said tubes for frictionally mounting said chassis to the frame via said track members to facilitate the relative free movement of chassis and frame to permit different fields of view.

2. Spectacles according to claim 1 and wherein said bushing means are composed of acrylic flexible fibers material disposed to flex and follow the contour of said tracks.

3. Spectacles according to claim 2 and wherein said acrylic fiber material is nylon.

4. Spectacles with adjustable lens according to claim 1 and wherein said spaced-apart track members are each disposed to having their extremities fixedly attached to said frame.

* * * * *